United States Patent [19]

Bray et al.

[11] 4,230,579
[45] Oct. 28, 1980

[54] BRINE FLOW CONTROL FOR MEMBRANE SEPARATION SYSTEM

[75] Inventors: Donald T. Bray, Escondido; Raymond A. Tondreau, San Marcos, both of Calif.

[73] Assignee: Desalination Systems, Inc., Escondido, Calif.

[21] Appl. No.: 2,353

[22] Filed: Jan. 10, 1979

[51] Int. Cl.³ .............................................. B01D 13/00
[52] U.S. Cl. .................... 210/101; 210/117; 210/321 R
[58] Field of Search ............... 210/96 M, 101, 136, 210/116, 117, 321 A, 433 M, 257 M; 137/89, 113, 114, DIG. 4, DIG. 5

[56] References Cited

U.S. PATENT DOCUMENTS

| 3,442,002 | 5/1969 | Geary, Jr. et al. | 210/321 R |
| 3,747,763 | 7/1963 | Kain | 210/257 M |
| 3,939,074 | 2/1976 | Bray | 210/257 M |
| 4,077,883 | 3/1978 | Bray | 210/136 |

Primary Examiner—John Adee
Attorney, Agent, or Firm—Clement H. Allen

[57] ABSTRACT

A reverse osmosis system including a proportioning flow control, for controlling brine flow from a pressure resistant vessel containing a membrane cartridge, which has ends of two small diameter duct portions enclosed inside a hollow body, which is separate from the pressure resistant vessel containing the membrane cartridge. Means, such as a unitary mass of solidified epoxy adhesive, seals the passage of each of the duct portions through a wall of the hollow body and leaves space within the hollow body with which the open ends of the small diameter duct portions communicate and which itself communicates with a relief valve connected to a collector or tank for storage of permeate from the membrane cartridge under elevated pressure.

5 Claims, 3 Drawing Figures

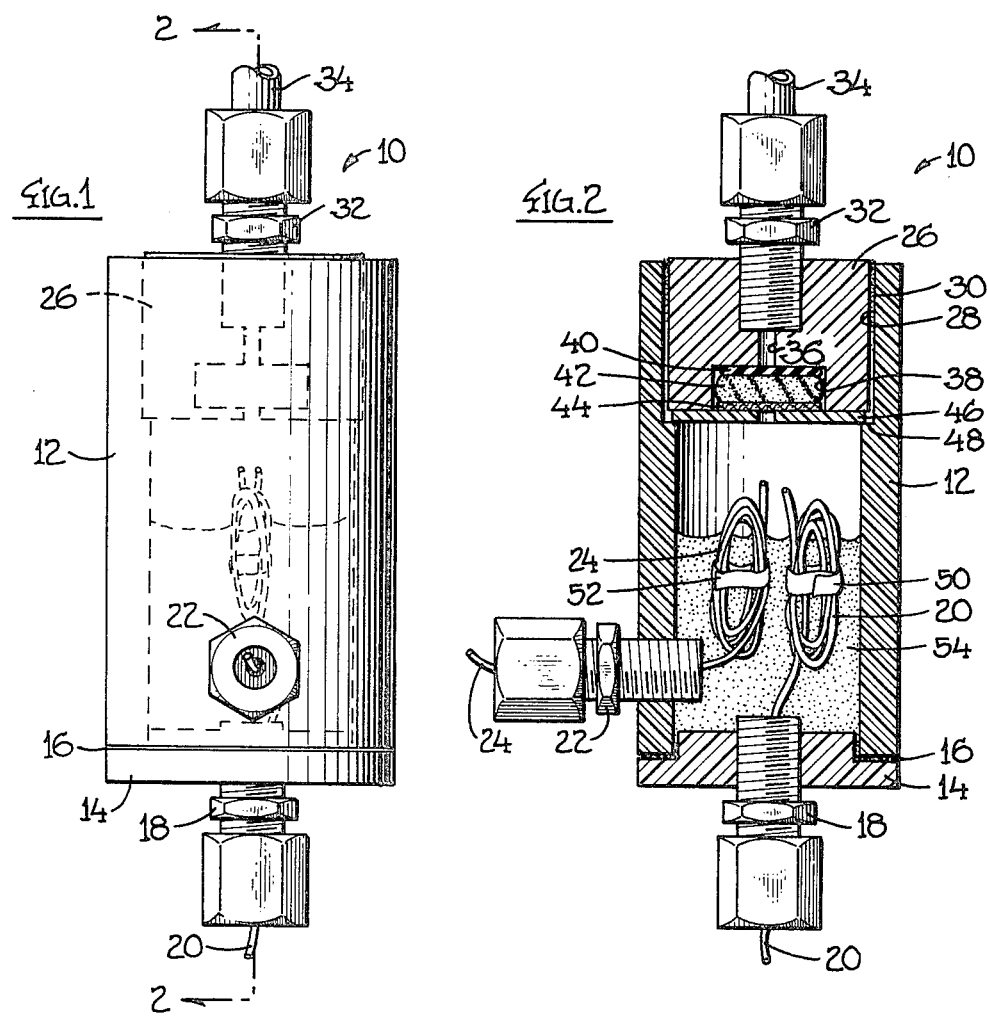
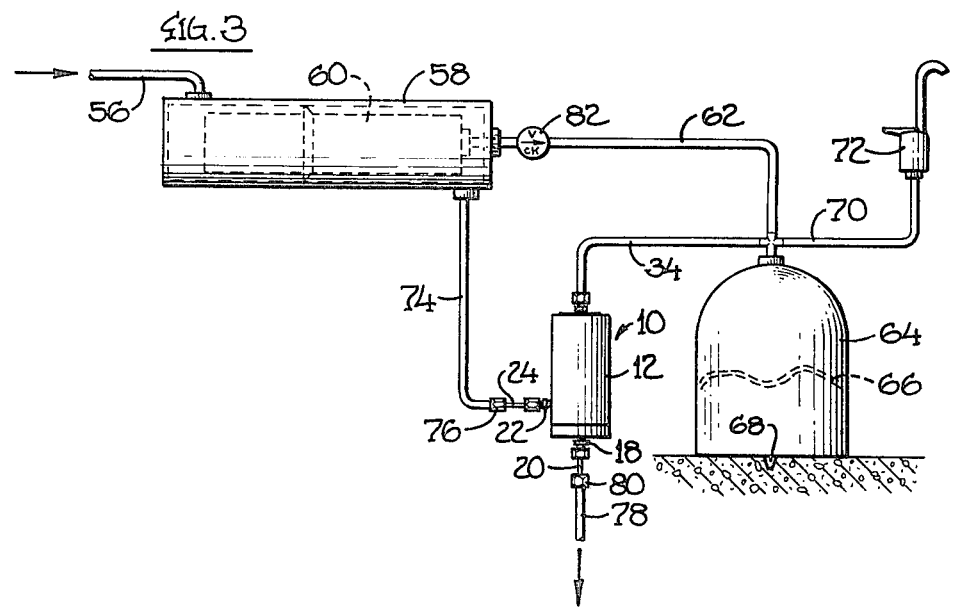

BRINE FLOW CONTROL FOR MEMBRANE SEPARATION SYSTEM

BACKGROUND OF THE INVENTION

1. The Field of the Invention

This invention relates to a proportioning flow control for controlling brine release from a membrane cartridge, as in a reverse osmosis system.

2. The Prior Art

In U.S. Pat. No. 4,077,883 issued Mar. 7, 1978, there is disclosed apparatus for controlling the flow of brine from a pressure resistant vessel containing a semipermeable membrane cartridge, as employed in a reverse osmosis system. The apparatus comprises an elongated small diameter duct formed of two portions. The open ends of these two small diameter duct portions are enclosed in a common compartment contained within the pressure resistant vessel and which is connected through a relief valve to means for collecting and storing permeate from the semipermeable membrane cartridge, under elevated pressure.

This arrangement functions well to control brine flow as well as controlling the permeate storage pressure, but assembly of the components has been laborious and expensive and location within the pressure resistant vessel requires disassembly of this vessel for any required flow control servicing. A flow control device which could be arranged outside of, or separate from, the pressure resistant vessel containing the membrane cartridge would be advantageous to provide a more accessible device but could result in sealing problems not encountered in the apparatus of U.S. Pat. 4,077,883. This occurs because the compartment of U.S. Pat. No. 4,007,883 operates with an internal pressure lower than the external pressure to which it is exposed within the pressure resistant container. Therefore any slight inleakage will automatically pass out through the drain connection from the compartment. Leakage from a flow control located outside or separate from the pressure resistant vessel, however, may result in external dripping and formation of water pools in the area in which the system is installed.

Choice of material for the tubing from which the small diameter duct portions are fabricated may cause additional difficulties. Plastics, such as fluorinated hydrocarbons, which are capable of being drawn into tubing of excellent physical properties and uniformity, retain a slick or slippery surface to which sealants and adhesives will not ordinarily readily bond.

A simple proportioning flow control, with adequate sealing for use outside or separate from the pressure resistant vessel would be advantageous.

SUMMARY OF THE INVENTION

This invention relates to reverse osmosis apparatus, including a proportioning flow control, useful for controlling brine flow from a pressure resistant vessel containing a membrane cartridge, and also for controlling pressure of permeate passed through the membrane and stored in a container such as a tank under elevated pressure. An elongated small diameter duct formed of two portions, one open end of each of these portions communicating with a space within a common compartment. Means are provided, including a relief valve, for connecting the space within the common compartment to the container for storing permeate. The relief valve is normally closed to flow from the permeate storage container to the compartment space, but opens when pressure in the storage compartment rises above the pressure in the space in the compartment so that excess permeate is released to drain through one of the small diameter duct portions. The other small diameter duct portion may be connected to the interior of the pressure resistant vessel containing the membrane cartridge so that brine produced may also be released to drain, under proper pressure control.

The common compartment comprises a hollow body separate from the pressure resistant vessel containing the membrane cartridge. Each of the small diameter duct portions is sealed to the wall of the hollow body where it passes through, preferably by a combination of a compression fitting and a mass of solidified adhesive in the bottom of the hollow body immersing the part of each of the small diameter duct portions which passes through the body wall (side wall or bottom wall) and leaving a space within the hollow body with which the open interior ends of the small diameter duct portions and the relief valve communicate.

A preferred method for producing the proportional flow control comprises first passing each of the small diameter duct portions through a wall of said body near the lower end thereof, the passage of each of said small diameter duct portions through a body wall being secured by a mechanical connection, such as a compression fitting. Then solid setting adhesive, such as an epoxy composition, in liquid form is introduced into the hollow body in upright position in amount to immerse the area of the passage of both small diameter duct portions through a wall or walls of the hollow body, while leaving a space with which the open ends of the small diameter duct portions and the relief valve communicate. Then the hollow body is maintained in upright position until the adhesive has set to form a unitary, solid mass. An excellent hermetic seal is obtained even with slippery surface duct tubing.

BRIEF DESCRIPTION OF THE DRAWINGS

In the drawings:

FIG. 1 shows a general view of apparatus embodying features of this invention.

FIG. 2 shows a vertical central cross section of the apparatus of FIG. 1, taken along the line 2—2.

FIG. 3 shows the apparatus of FIG. 1 in operation in a reverse osmosis system.

DESCRIPTION OF PREFERRED EMBODIMENTS

Referring now to FIGS. 1 and 2, the proportioning flow control 10 comprises a tubular body 12 suitably fabricated, for example, of strong, pressure resistant plastic such as ABS. The bottom wall or end 14, with the apparatus upright as shown, is securely glued to tubular body 12 by a layer 16 of an adhesive, such as an epoxy composition, shown of exaggerated thickness for clarity. A fitting 18 is screwed into bottom end 14 through which is conducted and fixed an end of elongated small diameter duct portion 20. Another and similar fitting 22 is screwed into the sidewall of body 12 and through which is passed and fixed an end of elongated small diameter duct portion 24. Fittings 18 and 22 are of a mechanical connection type of conventional design known as "compression" fittings in which tightening the parts together forces a ferrule into intimate mechanical contact with the outer surface of a tube passing into or through it, and fixes or holds it in place as well as to some extent sealing its passage. The top wall or end of tubular body 12 is formed by a plug 26 securely glued to the sidewall of a recess 28 in the top of tubular body 12 by a layer 30 (of exaggerated thickness) of an adhesive, such as an epoxy composition. Plug 26 has fitting 32 screwed into its top portion to conduct a small pipe or tube 34 into communication with bore 36 which leads into the top of recess 38 in plug 26, which contains a check valve. This check valve comprises an impervious rubber disc 40 which is normally urged into sealing relationship with bore 36 by a porous rubber or elastomer spring 42 held in place by porous fabric or felt disc 44 which may conveniently be held as shown in recess 38 by perforated plastic plate 46 sealingly glued to ledge 48 in the sidewall of tubular body 12.

The two elongated small diameter duct portions 20 and 24 are each wound into flat elongated coil or loop form and secured in this condition as by adhesive tape wrappings 50 and 52 respectively, and, together with their fittings 18 and 22, are sealed to side and bottom wall of tubular body 12 by a unitary mass 54 of solidified adhesive, such as epoxy, inside tubular body 12 and which is of such shape and volume to leave the open ends of elongated small diameter duct portions 20 and 24 in communication with a space, initially open, above solidified adhesive mass 54.

The proportioning flow control of this invention is useful for controlling brine flow from a pressure resistant vessel containing a membrane cartridge and pressure in a permeate storage tank as shown, for example, in FIG. 3, which illustrates the device in operation. In FIG. 3 pressurized feed water is introduced through pipe 56 into pressure resistant vessel 58 which contains a conventional semipermeable membrane cartridge 60, which may be of the so-called spiral wound type suitable for reverse osmosis treatment of the feed water. The permeate from membrane cartridge 60 is conducted out of pressure resistant vessel 58 through pipe or tubing 62 into a pressure resistant storage tank 64 having a flexible and impermeable diaphram 66 which separates permeate stored in the upper portion of tank 64 from a compressible driving fluid in its lower portion. The driving fluid in the lower portion of tank 64 may advantageously be compressed air initially introduced thereinto at a pressure of a few pounds, for example about 5 p.s.i., through a suitable sealable fitting 68. The top of tank 64 is also connected by pipe 70 to a faucet 72 through which permeate may be dispensed, and also by pipe or tube 34 into the top of proportioning flow control 10 as illustrated in FIGS. 1 and 2. The brine outlet of pressure resistant vessel 58 is connected through pipe 74 and by means of coupling 76 to small diameter duct portion 24 which passes through fitting 22 and the sidewall of tubular body 12 of proportioning flow control 10 and into its interior. In like manner a pipe 78 to drain, or other disposal, is connected through coupling 80 to the other small diameter duct portion 20 which passes through its fitting 18 and the bottom of tubular body 12 and also into its interior. A check valve as shown at 82 may advantageously be installed in permeate delivery pipe 62 to prevent back flow of permeate into cartridge 60 if, for example, the pressure in feed water line 56 may drop substantially or be shut off.

The total length and internal diameter of combined small diameter ducts 20 and 24 will determine the flow restricting effect on the brine flowing from pressure resistant vessel 58 through restrictor 10 to drain outlet pipe 78. For example, in a reverse osmosis system for purifying municipal supply water containing about 800 ppm total dissolved solids to produce water of so-called "bottled water" grade, a supply pressure of for example 60 psi can be maintained at about 56-58 psi operating pressure within pressure resistant container 58 by a total small diameter duct (duct portion 20 plus duct portion 24) length of 17 inches of teflon fluorinated hydrocarbon tubing of 0.023 inches internal diameter. If, for example, the two small diameter duct portions are of equal length and fabricated of the same internal diameter tubing then the pressure of the permeate in the top part of storage tank 64 will be automatically maintained at about 50% of the total brine pressure of 56 to 58 psi, that is about 28 to 29 psi. If more permeate is produced by cartridge 60 than is dispensed through faucet 72 the pressure of the permeate in the upper part of storage tank 64 will rise. When it rises above the 28-29 psi control pressure, the relief valve in proportioning flow control 10 opens and excess permeate flows to drain together with the brine flow, through small diameter duct portion 20 and pipe 78. When the pressure in the upper part of storage tank 64 is lowered, as by withdrawal of permeate through faucet 72, the check valve in proportioning flow control 10 closes and pressure starts to build up again in storage tank 64.

It will be understood that the volume inside tubular body 10 referred to as the space above solidified adhesive 54, is initially open, but when the device is in operation will become filled with brine or a mixture of brine and permeate from the membrane cartridge.

As an example of the method of sealing the two small diameter duct portions 20 and 24 in their passage through a wall of the hollow flow control body, the body 12 may be fabricated, as illustrated in FIGS. 1 and 2 by conventional casting or forming methods from a strong, pressure resistant plastic such as ABS. The small diameter duct portions 20 and 24 may be fabricated from fluorinated hydrocarbon such as TEFLON tubing and may be roughened or chemically etched to provide additional "tooth" for adhesion of the epoxy. With duct portions looped as shown inside hollow body 12 and compression fitting 18 and 22 tightened respectively around small diameter duct portions 20 and 24, body 12 is then supported in vertical position as illustrated in FIG. 1 with its top open. A solid setting epoxy composition, such as EPON RFC 879 produced by Shell Chemical Company, is prepared with its catalyst in liquid form and poured into the open top of hollow body 12 until the areas of passage of both small diameter duct portions 20 and 24 through the bottom and sidewall of hollow body 12 are immersed. Preferably a substantial portion but not all of the length of each of these duct portions is also immersed so that the upper end of each is open to communicate with the space above the epoxy level. The hollow body 12 is maintained in upright position for several hours or more, until the unitary mass of epoxy has completely solidified. The relief valve assembly including plug 26 and valve elements 40, 42,44 and 46 is then placed in recess 28 and glued in place.

The proportional flow control of this invention solves the problem of providing a securely sealed device which may be employed separate from the pressure resistant vessel 58 housing the semi-permeable membrane cartridge. The small diameter duct or tubing necessarily employed is difficult to reliably seal in its passage through the walls of the body of the device because of its small diameter, and because of the smooth or slippery outside surface of preferred materials for example nylon or fluorinated hydrocarbon such as TEFLON. The compression fittings 18 and 22 employed to grip the small diameter tubing and secure its passage through a wall of the body 12 will form a preliminary, more or less tight joint, and will hold a liquid epoxy mixture in the device until it solidifies to form a hermetic and permanent seal. The connection 34 to the relief valve in the top of hollow body 12 will generally be of larger diameter tubing than that of duct portions 20 and 24 and, since its dimensions are not critical, it may be fabricated of materials such as copper tubing or plastics whose surface is more amenable to compression fitting sealing. Additional adhesive sealing is not therefore necessary at this point.

We claim:

1. A reverse osmosis purification system comprising in combination a pressure resistant vessel containing a membrane cartridge, means for introducing pressurized feed liquid into said pressure resistant vessel, means for conducting permeate passed through said membrane out of said pressure resistant vessel and into a container, and a proportioning flow control for controlling the brine release from said pressure resistant vessel containing said membrane cartridge and for controlling pressure of permeate passed through said membrane and stored in said container under elevated pressure, comprising, an elongated small diameter duct formed of two portions, one open end of each of said small diameter duct portions communicating with a space within a common compartment, and means including a relief valve, for connecting said space within said common compartment to said container for storing said permeate, said relief valve normally closed to flow from said container for storing said permeate; in which the improvements comprise;

a. said common compartment comprising a pressure resistant hollow body separate from said pressure resistant vessel containing said membrane cartridge;
   b. each of said small diameter duct portion passing through a wall of said hollow body and having an open interior end communicating with said space within said hollow body; and,
   c. means inside said hollow body and in part contained by the bottom wall of said hollow body for sealing each of said small diameter duct portions to said wall of said hollow body where each of said small diameter duct portions passes therethrough.

2. A proportioning flow control according to claim 1 in which said means for sealing each of said small diameter duct portions in its passage through a wall of said hollow body comprises a unitary mass of solidified adhesive in said body immersing the part of each of said small diameter duct portions passing through said wall of said hollow body, leaving a space within said hollow body with which the open end of each of said small diameter duct portions and said relief valve communicate.

3. A proportioning flow control according to claim 2 in which said solidified adhesive comprises an epoxy composition.

4. A proportioning flow control according to claim 3 in which said small diameter duct portions are fabricated of fluorinated hydrocarbon.

5. A proportioning flow control according to claim 2 in which the passage of each of said small diameter duct portions through said wall of said hollow body is secured by a compression type fitting and sealed by said unitary mass of solidified adhesive.

* * * * *